Nov. 17, 1959　　　　R. E. WADE　　　2,913,086
SEED DISTRIBUTING SHOE
Filed July 30, 1956　　　　　　　　　　2 Sheets-Sheet 1
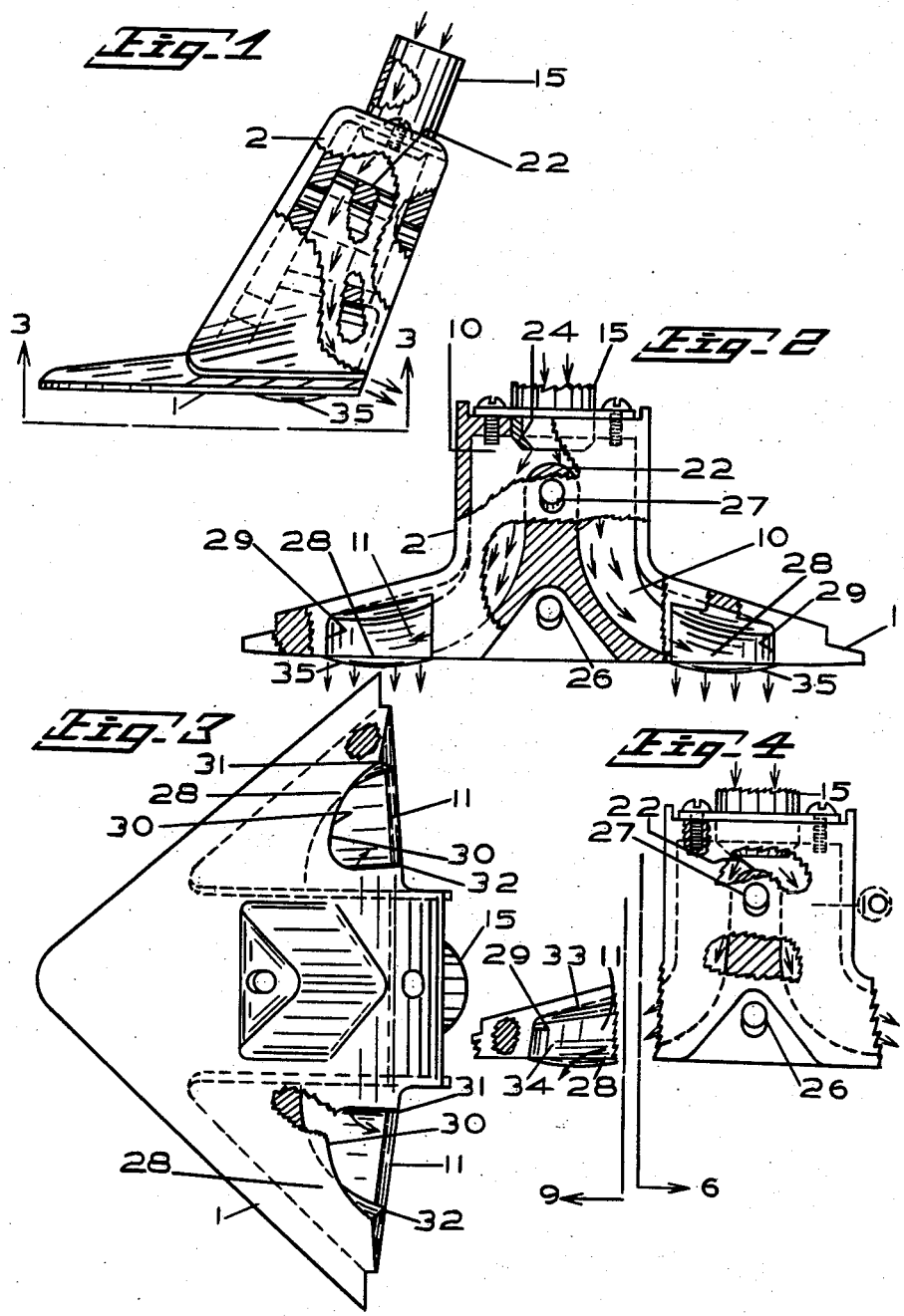
INVENTOR.
Robert Edgar Wade
Per L. S. Mitchell
Attorney Nov. 17, 1959    R. E. WADE    2,913,086
SEED DISTRIBUTING SHOE
Filed July 30, 1956    2 Sheets-Sheet 2
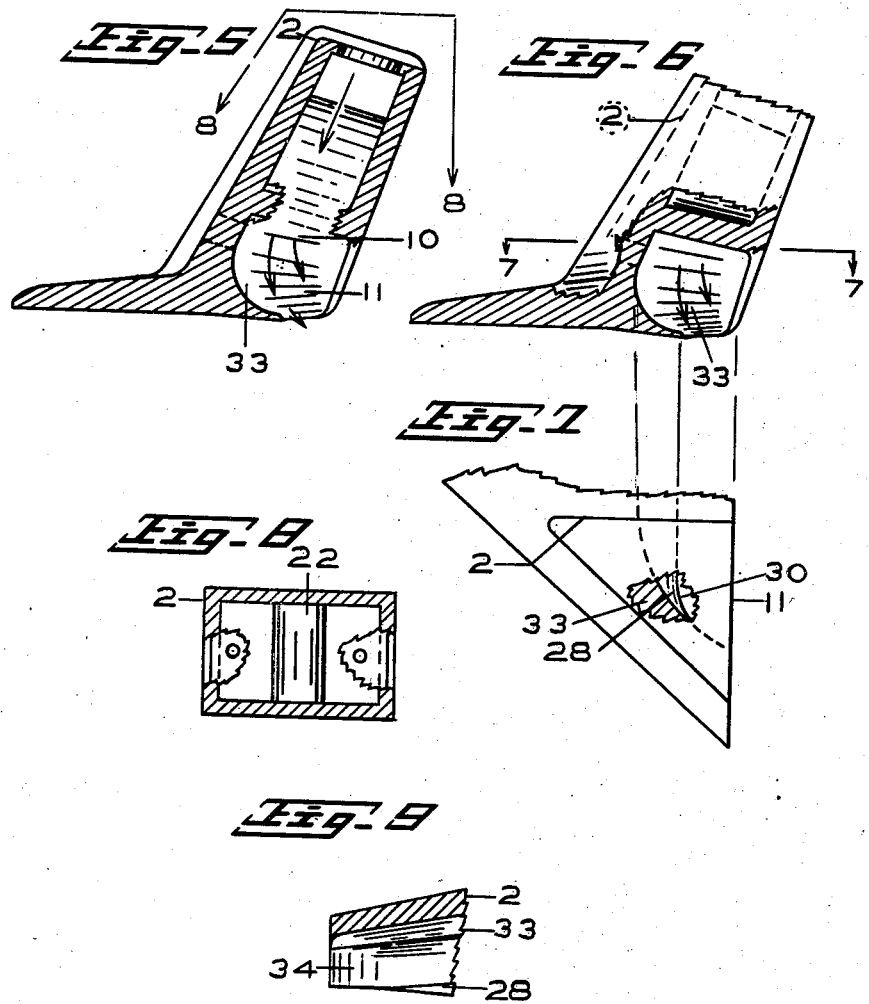
INVENTOR.
Robert Edgar Wade
Per L. S. Mitchell
Attorney

United States Patent Office

2,913,086
Patented Nov. 17, 1959

2,913,086

SEED DISTRIBUTING SHOE

Robert E. Wade, Consort, Alberta, Canada

Application July 30, 1956, Serial No. 600,934

4 Claims. (Cl. 193—9)

My invention relates to distributing shoes for seed grain and the like, this being a continuation-in-part application in respect to subject matter disclosed in a pending application filed under date of September 23, 1953, Serial Number 381,860, and now Patent Number 2,834,446.

In this pending application a distributing shoe is disclosed embodying a base with upstanding column, which column is apertured to receive a seed inlet tube and has further apertures diverging in flared sides of the column and divided at the upper or communicating end with respect to the seed inlet by a saddle designed to direct seed into the diverging apertures from the inlet tube.

These diverging apertures discharge through outlets at the lower rear of the shoe and it is with these outlets and their co-operation with the saddle, seed inlet tube and diverging apertures that the present invention is concerned.

This co-operation is brought about by a swirling motion imparted to the seed by the inlet tube and saddle causing it as it emerges from the diverging apertures to strike against and be deflected by upper tapered portions and curved lower portions of the outlets and spread for discharge in even rows.

One of the objects of the present invention is accordingly to provide improved outlets for a seed distributing shoe, adapted, in conjunction with means in the shoe for feeding seed to the outlets, to discharge the seed in even rows.

A further object of the invention is to provide a shoe with improved under side adapted to prevent dirt entering and clogging the seed outlets.

With the above and other objects in view as will become apparent by reference to the accompanying description my invention resides in the formation of a seed distributing shoe as herein described and as disclosed in the accompanying drawings, in which drawings like characters of reference indicate like parts throughout the several views, and in which:

Fig. 1 is a side view of a shoe embodying my improvements, shown partly broken away and partly sectioned.

Fig. 2 is a rear end view of the shoe, broken away in part and sectioned.

Fig. 3 is an inverted plan view of same, shown with part broken away and in section.

Fig. 4 shows a rear end view of the shoe broken away in part and in part sectioned, and including a separate fragment of one side of the base.

Fig. 5 shows a side view in vertical section of the body of the shoe taken by itself, shown in part broken away.

Fig. 6 is a side view of the shoe body as taken on a line 6—6 of Figure 4, shown partly in section and in part broken away.

Fig. 7 is a plan view of a fragment of the shoe base, shown as viewed from a line 7—7 of Figure 6, and further shown broken away in part and in part sectioned.

Fig. 8 is a top view of the shoe body as viewed from the line 8—8 of Figure 5, shown in part broken away.

Fig. 9 is a view partly in section of a fragment of the base, shown as taken on a line 9—9 of Figure 4.

Having reference to the drawings the shoe provides a grain inlet tube 15 having its extreme lower end portion turned inward to provide an annular downwardly inclined ledge terminating in a delivery outlet. The tube is mounted in a column 2 on a base 1 of the foot, the column providing diverging apertures 10 with which the tube 15 communicates and a semi-circular saddle portion 22 by which the seed fed from the tube 15 on to the saddle is divided into the apertures 10. These apertures provide outwardly inclined lower end portions discharging into outlets 11 that form a continuation of the apertures and it is with these outlets that the present invention is concerned, and including their relation to the movement of seed from the tube 15 through the constricted outlet 24 over the saddle and through the apertures 10, all these parts being as disclosed in the prior application.

These outlets 11 form outward continuations of the apertures 10 and discharge rearwardly of the foot. It is essential that the seed be evenly distributed in the seed bed in a row of a width as defined by the ends 31 and 32 of the outlets.

The seed discharging from the tube 15 is constrained by the curved inwardly turned outlet 24, which in conjunction with the saddle portion 22 and outwardly flared apertures 10 has the effect of imparting a swirling motion to the seed so that as the seed emerges from the apertures 10 it may be spread for even distribution from the outlets 11. For this the outlets 11 are cored and provide concavely curved outer side and back portions 34 and 33 indicated generally by the numeral 29 and rearward downwardly inclined flat delivery portions 28, these delivery portions including semi-circular recessed portions 30, the ends of which recessed portions are defined by numerals 31 and 32, and over which recessed portions the seed discharges and is adapted thereby to be confined to even rows.

In actual practice the swirling movement imparted to the seed is utilized by the tapered portion 29 against which the seed impinges and is scattered over the ledge 28 for discharge, coming out in an even row that is preferably two inches in width, corresponding to the width of the outlets 11, there being a four inch space between rows where the shoe is travelling on a side hill the scattering of the seed over the flat delivery portions 28 is essential for even distribution, since otherwise seed on the higher sides would fall out short of the spreading width of the outlets, and on the low side the seed would fall out in a stream in a downhill direction. By the use of these flat delivery portions even distribution of the seed is obtained.

To prevent dirt accumulating in and clogging the outlets 11 the rear under side of the base 1 is formed with a raised portion 35 immediately in advance of the outlets.

The numerals 26 and 27 indicate holes for bolts by which the shoe may be attached to the cultivator foot.

While I have herein disclosed a preferred embodiment of my invention it is obvious that changes would be readily conceivable, but in so far as such changes come within the spirit and scope of the invention as defined by the appended claims they would be considered a part hereof.

Having thus particularly described and ascertained the nature of my said invention, what I claim and wish to secure by Letters Patent is:

1. A seed distributing foot providing a base portion and a column on the base portion, a seed inlet tube mounted in the upper end of said column, said tube having its extreme lower end portion turned inward to provide an annular downwardly inclined ledge terminating in a delivery outlet, said column having side apertures divided by a saddle on to which seed from the tube discharges, said saddle having its top portion extending transversely between the apertures and said top portion being semi-circular in cross section, the lower portions of said saddle and those portions of the column through which the apertures pass inclining outwardly sidewise and the base portions of said foot providing cored outlets to which the apertures deliver, said outlets having concavely curved side and back portions in opposing relation to the apertures and rearward, downwardly inclined, flat delivery portions, said delivery portions having semi-circular recessed portions over which the seed discharges.

2. A device as in claim 1 in which the under sides of the base portions are formed with raised portions in advance of the delivery edges of said outlets and on which raised portions the foot is adapted to travel.

3. A seed distributing foot having a column with two delivery apertures divided by a saddle and in which the lower portions of said saddle and column incline sidewise to form the lower portions of the apertures outwardly directed, said foot having cored outlets to which the apertures discharge, said outlets having curved portions in opposing relation to the aperture outlets and against which curved portions seed discharged from the apertures is adapted to strike, and said outlets having downward, rearwardly inclined, flat delivery portions over which seed striking the curved portions of the outlets may be scattered.

4. A device as in claim 3 in which the flat delivery portions of the cored outlets are formed with semi-circular recessed delivery portions over which final discharge of the seed may be effected.

References Cited in the file of this patent
UNITED STATES PATENTS

| | | |
|---|---|---|
| 740,091 | Cole | Sept. 29, 1903 |
| 939,964 | Arnold | Nov. 16, 1909 |
| 1,494,351 | Gillard | May 20, 1924 |
| 1,934,490 | Elliot | Nov. 7, 1933 |
| 2,227,759 | Nemanick | Jan. 7, 1941 |
| 2,749,856 | Fleming | June 12, 1956 |
| 2,834,446 | Wade | May 13, 1958 |